United States Patent [19]

Plevyak

[11] 4,046,037
[45] Sept. 6, 1977

[54] BOX TOOL
[76] Inventor: Joseph B. Plevyak, 19 Jefferson St., Newton, N.J. 07860
[21] Appl. No.: 254,772
[22] Filed: May 15, 1972
[51] Int. Cl.$^2$ .................. B23B 29/16; B23B 29/18
[52] U.S. Cl. ............................................. 82/35
[58] Field of Search ........................................ 82/35
[56] References Cited
U.S. PATENT DOCUMENTS

| 672,399 | 4/1901 | Hartness | 82/35 |
|---|---|---|---|
| 1,056,097 | 3/1913 | Hartness | 82/35 |
| 3,349,656 | 10/1967 | Plevyak | 82/35 X |

Primary Examiner—Leonidas Vlachos

[57] ABSTRACT

A turret lathe box cutting-tool adaptable for interchangeable right hand and left handed cutting of a rotating workpiece, including mechanism for synchronized movement of the cutting blade and of the piece-support rollers to and from predetermined-set positions before initiating cutting and subsequent to cutting but before withdrawing of the workpiece such that pressure of the blade and of the supporting rollers is relieved by withdrawal from the predetermined-set positions prior to the withdrawal of the cut workpiece thereby substantially eliminating any possibility of scarring of the cut workpiece before the moving axially of the blade and rollers away from the cut workpiece.

6 Claims, 2 Drawing Figures

U.S. Patent  Sept. 6, 1977  4,046,037
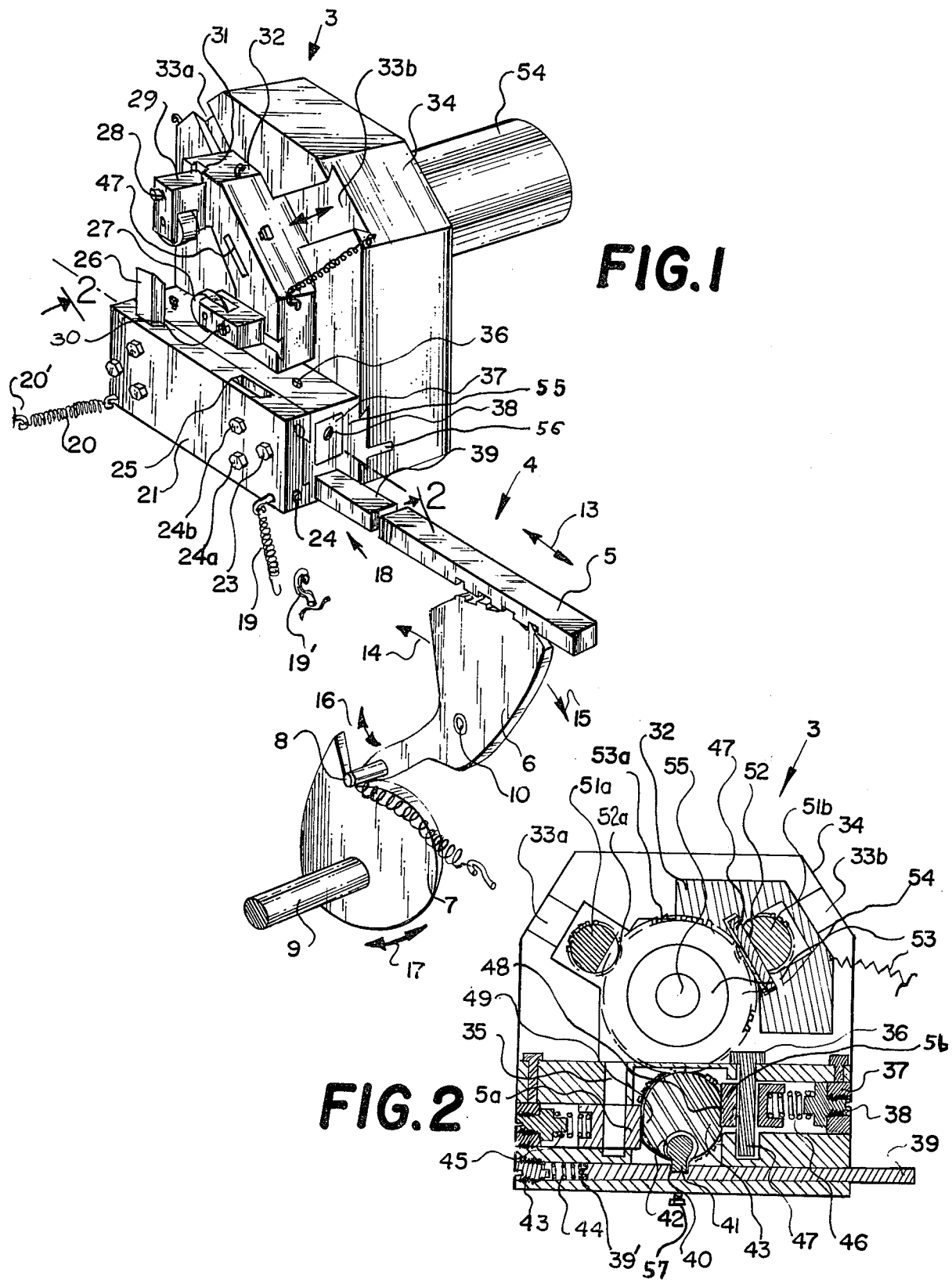

BOX TOOL

THE SPECIFICATION

This invention relates to a turret-lathe box cutting-tool.

BACKGROUND OF THE INVENTION

Prior to the present invention, there has existed a plurality of problems and difficulties with box tools of the type to which this invention is directed, such as the type dealt with in the Plevyak U.S. Pat. No. 3,538,731, the disclosure of which is incorporated herein by reference. Prior to the present invention a major undesirable inherent problem associated with all prior box tools of these type was the fact that upon the separation of the workpiece from the cutting blade and supporting rollers subsequent to the cutting operation, the rotating workpiece became scarred in a corkscrew manner because of the residual pressure of the cutting blade and support rollers on the cut surface of the workpiece. Another problem also arose from the fact that when a tool post carrying a cutting knife adapted to operate on a workpiece supported on a spindle chuck and the knife thereof cutting from a second position as compared to the cutting piece of the box tool blade to which this invention is directed, eventual dulling of the side position blade required the removal of that blade and reinsertion thereof and a resulting resetting after the sharpening, which resetting also required that the blade of the box tool to which this invention is directed be also reset again because of the fact that the separate blades are commonly actuated by a single lever mechanism, whereby adjustment of one blade requires the resetting of the other blade prior to the present invention.

SUMMARY OF THE INVENTION

It is an object of the present invention to overcome one or more of the problems and difficulties of the type discussed above.

Another object is a box-cutting tool interchangeably utilizable for left-hand and right-hand cutting of a rotated workpiece.

Another object of the present invention is a box-cutting tool in which the setting of the blade does not require resetting when other cutting tools are adjusted or reset.

Another object of the present invention is a structure accomplishing one or more of the preceding-noted objects, having a simplicity of structure and low cost of manufacture.

Another object is a work tool of the type discussed above of such structure that operation thereof is easy and simple.

Another object is a work tool of the type discussed above of economical manufacture and cost thereof.

Other objects become apparent from the preceding and following disclosure.

One or more of the objects are obtained by the invention as defined herein.

Broadly the invention includes a structural mechanism including a lever means which when actuated in a predetermined manner serves to move a mounting for a blade and to simultaneously and synchronously move supporting-guide rollers to a predetermined preset position in which the blade is cuttable of a rotatable workpiece and in which the supporting-guide rollers are supportable of the cut workpiece, and which when deactivated in a predetermined manner prior to the separation of the workpiece from the tool by the axial withdrawal of one from the other, results in the normaly radial withdrawal of the blade and the supporting-guide rollers away from contact with the cut rotating piece such that upon withdrawal of the cut piece from between the supporting rollers and the blade there is avoided the scarring of the workpiece. Also, in a particular preferred embodiment of the invention in which the lever means includes a rotatable shaft having a symmetrical convex surface in at least one section thereof which when actuated serves to directly or indirectly press forcibly and hold the blade mount and the mount for the rollers in the predetermined set position and such that because of the symmetrical annular circumferential surface of the shaft the preset positions do not require resetting when the lever is actuated fractionally to a greater degree which merely results in a tuning of the shaft slightly further but because of the symmetrical surface the shaft not further moving either the blade mount or the rollers radially inwardly toward the workpiece.

The invention as broadly described above is better understood by reference to the accompanying FIGS. 1 and 2 described below.

THE FIGURES

FIG. 1 illustrates a perspective view of the inventive work tool of the present invention, together with diagrammatic actuation mechanism typically representative of a turret lathe actuation mechanism.

FIG. 2 illustrates a cross sectional view of the box tool of FIG. 1 as taken along line 2—2 of FIG. 1.

DETAILED DESCRIPTION OF THE INVENTION

In greater detail, with reference to FIGS. 1 and 2, broadly the box tool 3 is actuated by a ram mechanism 4 including a ram lever 5 which when element 6 moves forward in direction 14 rams and presses to a predetermined point against the lever 39, an which when the element 6 moves in direction 15, the ram lever 5 moves in the opposite one of directions 13. The element 6 is pivotably mounted at pivot point 10 and actuatable around the pivot point 10 in to and fro directions 16 by movement of element 7 on shaft 9 against key 8 or relieving pressure against key 8 whereby the spring attached to key 8 draws the key 8 back into its original positions still snug against the element 7. The actuation mechanism such as diagrammatically represented by the members 7, 9, 8, 10, 6, and 5 do not constitute a part of this invention, such mechanism being a standard and conventional actuation mechanism for turret box cutting tools of the type to which this invention is directed. An overall blade-support structure 18 is movably mounted within a base support structure 34 having a shank 16 mountable within a turret (not shown) typically of the type diagrammatically illustrated in the U.S. Pat. No. 3,538,731 and this overall support structure 18 being movable by a minor predetermined amount to and from a predetermined set cutting position by virtue or movement of the lever 39 within structure 55. The exact position of the blade 26 and its support 21 is predetermined by presetting the slide 21 on the movable support 55, this being accomplished by mounting the blade 26 in either of the available slots such as slot receiving-position 25, the bolts 24 and 24a (these being merely typical) being loosened before insertion of the blade and tightened after the insertion of the blade and the position of the slide 21 being set by loosening of bolts such as 23 before positioning and the tightening of the bolts 23 after positioning of the slide 21 on its movable base 55. Accordingly, it should be noted that the movable and settable nature of slide 21 relative to the movable support 55 corresponds to comparable prior art adjustment mechanisms for moving the blade to and from one set position to another set position for different cutting positions. The inventive concept of the present invention does not relate to this adjustment so much as it relates to the movement of the movable support 55 relative to the support base 34. Similarly, the invention does not relate so much to the movement of the support and guide rollers 27 which are adjustably movable by virtue of their respective adjustmemt locking and unlocking screws 28 and 30 for locking typically the support 29 onto the slidable support base 32 which is slidable within the groove 33b, rather the invention additionally relates, as regards the rollers to the support 32 being slidable within the groove 33b for cutting on one side of the workpiece and in the groove 33a for mounting the slidable support 32 therein for work from an opposite direction on a workpiece. Both the support 32 is movable toward a workpiece and the support base 55 is movable of the blade 26 mounted in one or the other of its receiving positions 25 for movement of the blade in a direction toward the workpiece when pressure is applied against lever 39. As is conventional, the support 29 is movable in a slot such as 31 for merely adjusting the set position, this being comparable to the presetting of a blade at a desired cutting position.

The heart of the invention is better disclosed in FIG. 2 as follows. Pressure of the lever 5 against the lever 39 causes the key 41 mounted in the cavity 42 to move the shaft 43 in a clockwise direction whereby the left and right flattened surfaces 48 and 49 press against elements 5a and 5b as well as teeth 56 located on a rear portion of the shaft 43 acting with teeth 53a of shaft 53 to move the shaft 53 in a counterclockwise direction and the teeth 53a acting with the teeth 57 on a rearward portion of the shaft 51b to bring about rotary movement of the shaft 51b in a clockwise direction whereby the rounded surface 58 presses against the inserted key 47, the pressure of the surface against key 47 causing the base 32 to move inwardly towards the blade 26 to the extent of the predetermined set position (set for engagement at the point when pressure is applied against lever 39). The slidable member 5a is slidable laterally when the space 35 is free of the key 36 which in the illustrated embodiment of FIG. 2, the key is inserted in the corresponding slot of slidable member 5b. When the member 5a slides laterally by action of the raised — i.e. curved surface of the shaft 43 being pressed against it during clockwise movement of the shaft 43, the member 5a is pressed against the spring action of a spring supported by spring support 45, a typical spring being 46 and the spring support 45 being adjustable by virtue of a threaded shaft of a screw portion 38 for screwing the spring support further or lesser distances inwardly. The threaded head 38 is mounted in the snugly fitted insert 37 held in position by lock screw 36. The shaft 43 includes the flattened faces 48 and 49 on opposite sides of the circumference of the shaft. When the rotation of the shaft 43 causes the shafts 51a and 51b to rotate as a result of the rotation of the member 53, the existance of the insert 47 within the insert slot brings about the movement of the curved edge or surface 58 against the member 47 in order to cause the member 32 to slide into slot 33b or into slot 33a as the case may be inwardly toward the workpiece to be cut. Also viewable in this FIG. 2 embodiment is the hole 55 which extends through the center of the shaft 54. As is readily apparent from the view of the shaft 51a, further back in the shaft the shaft is completely round with the cutaway flat portion viewable which would receive the key 47. In order to remove the base 32 from its slidin inserted position in the slot 33b, the key 47 must first be withdrawn. Also viewable in FIG. 2 is a spring 44 biased against a projection 39' of lever 39 and biased also against the spring support 43 which includes a threaded shaft for screwing inwardly or outwardly to adjust the pressure of the spring.

As an alternative, the shaft 53 may have a toothless area adjacent each of the teeth 57 of each of shafts 51b and 51a respectively such that a delayed pressing actuation of 51a or 51b against the key 47 is achieved because the shaft 53 must thereby turn a few degrees before its existing teeth engage the shaft 51a or 51b, as the case may be.

As still another alternative embodiment, in order for the movment of the blade to be delayed, in its movement toward the workpiece, the flat faces 48 and 49 may be recessed from the contact surfaces of 5a and 5b such that only after shaft 43 has turned a few degrees does the raised (rounded) surfaces contact the respective elements 5a and 5b.

In another alternative embodiment the delayed forcible movement of the rounded surface of shaft 51b can be achieved by the flattened surface being raised from the key 47.

Other modifications or variations or substitution of equivalents as would be apparent to a person of ordinary skill are within the scope of this invention.

Nut 57 adjusts dovetail 56.

I claim:

1. A non-scarring set-retaining cutting tool device comprising in combination: a first lever means; a rounded rotatable-movable element having at least one lowered-surface section on at least one side of the rounded rotatable-movable element and having at least one substantially symmetrically-convexly rounded surface section of predetermined arc, said lowered section having a surface withdrawn from said convex surface and said lowered surface section being continuous with said symmetrically-rounded convex surface section serially located along the arc of said convexly surfaced section, said rounded rotatable-movable element being operatively engaged with said lever means such that movement of said lever causes said element to move rotatably of said rounded surface section in a direction along the arc substantially coincident with a convex surface of said convexly rounded surface; a movable blade-mounting member adjustably settable at different predetermined cutting positions and shaped to receive a position-lockable and position-unlockable key; at least one locking key means to lock and unlock against movement of said movable blade-mounting member in a first direction when in said receiving position; when locked in a key-receiving position, said movable blade-mounting member, said receiving position, and said rounded element being such in position relative to one-another that when said receiving position is locked by said key, rotary movement of said convexly-rounded surface section forcibly is movable of said movable blade-mounting member in first direction; and spring means for returning said movable blade mounting member from a position to which it has been moved in said first direction and for returning said lever means to a pre-actuation position; whereby movement of said lever in to and fro directions brings about movement of a mounted blade to and from said predetermined cutting position such that subsequent to cutting, scarring of a cut piece is substantially avoided by the blade being withdrawable from the cutting position before withdrawal of the cut piece; further there being at least one rotatable piece-mounting means, and movement means for movement of the movable blade-mounting member to and from a cutting position, and for transverse movement one relative to the other of the rotatable piece-mounting means and the movable blade-mounting member subsequent to movement of said movable blade-mounting member to a cutting position and for withdrawal of said movable blade-mounting member from said cutting position prior to transverse movement of one of said movable blade-mounting member and said rotatable piece-mounting means away from one-another; there being at least two lowered surface sections oppositely located and at least two convexly rounded surface sections oppositely located around a circumference of said rounded rotatable-movable element, said rounded rotatable movable element being in a substantially shaft-shaped form, and therebeing at least two separate lockable and unlockable positions for said lockable and unlockable key means which when in a second of said receiving positions is lockable and unlockable of movement of said movable blade-mounting member in an about opposite second direction relative to said first direction, said movable blade-mounting member being movable by contact movement of one of said convexly rounded surface section solely when one of said receiving positions is in an unlocked state while the other is in a locked state, such that when the second one of said second receiving positions is locked while simultaneously a first of said receiving positions is unlocked, said rotary movement of a second of said convexly rounded surface sections is forcibly movable of said movable blade-mounting member in said second direction, and such that when the first of said positions is unlocked while simultaneously the second receiving position is unlocked, said rotary movement of said convexly-rounded surface section is forcibly movable of said movable blade-mounting member in said first direction.

2. A non-scarring set-retaining cutting tool device of claim 11, including first and second piece-supporting guide rollers mounted on a common mount-movable structure, each of said first and second rollers being mounted for adjustable movement adjustable to and from a supporting-guiding position for a piece being cut at a predetermined position, each of said roller mounts being adjustable to different set positions, and said movable blade-mounting members being adjustable to different set positions, and including second lever means for transmitting rotary movement of said rotatable element to said commonly mounted rollers such that said rollers are movable to and from supporting positions responsive to to and from rotary movement of said elememt.

3. A non-scarring set-retaining cutting tool device of claim 2, in which said blade-mounting means includes two separate blade-mounting positions, one for left handed cutting and one for right handed cutting; and including a movable roller mount having each of said first and second rollers adjustably mounted thereon, the movable roller mount being detachable from a right hand mounting position and attachable to a left hand mounting position, there being included in said second lever means mechanical structure actuatable of to and fro movement of said common roller mount to and from a set position at each of right hand positions and left hand positions interchangeably.

4. A non-scarring set-retaining cutting tool device of claim 3, in which said device is a box-tool device utilizable on a screw-type machine, said teeth-mounting means being rotatable in a fixed position and said movable blade-mounting members, said first lever, said second lever, said rotatable element, and said locking member and receiving positions therefore being commonly mounted on a support base structure including a shank mountable within a turret lathe.

5. A non-scarring set-retaining cutting tool device of claim 2, in which actuation structure means for movement of said rollers toward a workpiece position is delayed relative to the movement of said movable blade mounting member.

6. A non-scarring set-retaining cutting tool device of claim 2, in which movement of said movable said blade-mounting members is delayed relative to the movement of said rollers toward a workpiece position.

* * * * *